US012232514B2

(12) United States Patent
Schultz et al.

(10) Patent No.: US 12,232,514 B2
(45) Date of Patent: Feb. 25, 2025

(54) INFUSING EDIBLE OIL INTO A BEVERAGE

(71) Applicant: Starbucks Corporation, Seattle, WA (US)

(72) Inventors: Howard D. Schultz, Seattle, WA (US); Natarajan Venkatakrishnan, Bellevue, WA (US); Jeffrey J. Chapman, Seattle, WA (US); Amy E. Dilger, North Bend, WA (US); Leslie A. Wolford, Seattle, WA (US)

(73) Assignee: Starbucks Corporation, Seattle, WA (US)

( * ) Notice: Subject to any disclaimer, the term of this patent is extended or adjusted under 35 U.S.C. 154(b) by 0 days.

(21) Appl. No.: 18/384,932

(22) Filed: Oct. 30, 2023

(65) Prior Publication Data

US 2024/0148029 A1    May 9, 2024

Related U.S. Application Data

(60) Provisional application No. 63/382,625, filed on Nov. 7, 2022.

(51) Int. Cl.
*A23L 2/56* (2006.01)
*A23L 33/105* (2016.01)
*A47J 31/44* (2006.01)

(52) U.S. Cl.
CPC .............. *A23L 2/56* (2013.01); *A23L 33/105* (2016.08); *A47J 31/4489* (2013.01); *A47J 31/4496* (2013.01)

(58) Field of Classification Search
CPC ................ A47J 31/4403; A47J 31/4489; A47J 31/4485; A47J 31/4496; A47J 31/42

USPC .......................................... 426/564, 590, 570
See application file for complete search history.

(56) References Cited

U.S. PATENT DOCUMENTS

| 4,618,500 | A | * | 10/1986 | Forquer | A23F 5/243 |
| | | | | | 426/433 |
| 6,228,415 | B1 | * | 5/2001 | Jimenez-Laguna | A23F 5/243 |
| | | | | | 426/101 |
| 6,231,909 | B1 | | 5/2001 | Levinson | |
| 2016/0081378 | A1 | | 3/2016 | Madsen et al. | |
| 2017/0079478 | A1 | * | 3/2017 | Kirsch | B65B 31/003 |
| 2021/0084922 | A1 | | 3/2021 | Wooster et al. | |

FOREIGN PATENT DOCUMENTS

| CA | 3173910 | A1 | | 10/2021 | | |
| JP | 2802660 | B2 | * | 9/1998 | ............. | A23C 13/12 |
| WO | WO-2021138547 | A1 | * | 7/2021 | ............. | A23F 5/267 |

OTHER PUBLICATIONS

JP-2802660-B2, Otani, Machine Translation, Sep. 24, 1998 (Year: 1998).*

(Continued)

*Primary Examiner* — Hong T Yoo
(74) *Attorney, Agent, or Firm* — Kilpatrick Townsend & Stockton LLP

(57) ABSTRACT

This application generally relates to incorporating edible oil into beverage products. One example can involve adding an edible oil to a container of a beverage appliance. The beverage appliance can then be actuated. When actuated, the beverage appliance can incorporate the edible oil into a beverage or a topping associated with a beverage product.

20 Claims, 4 Drawing Sheets

(56) References Cited

OTHER PUBLICATIONS

Arnold, Chris, "I Need Coffee by Coffee Fans, for Coffee Fans! Making Bulletproof Coffee", published online Feb. 3, 2014, p. 1-10, (Year: 2014).*

Nunaturals, https://www.nunaturals.com/blogs/recipes/keto-coffee-with-mct-oil-powder, published online Mar. 3, 2021, p. 1 (Year: 2021).* ewildagain.org, retrieved online May 22, 2024, pp. 1-6 https://www.ewildagain.org/fat-in-powdered-milk-replacers#:~: text=Since%20much%20of%20the%20natural, levels%20in%20the%20final%20product. (Year: 2024).*

My Crazy Good Life, put Coconut Oil in Coffee? Yes! It's a Coconut Oil Latte! pp. 1-7 https://web.archive.org/web/20130809054402/https://mycrazygoodlife.com/put-coconut-oil-in-coffee-yes-its-a-coconut-oil-latte/ (Year: 2013).*

Benton, Elizabeth, "Dos and Don'ts of Bulletproof Coffee—Primal Potential", Aug. 3, 2015, pp. 1-10 https://primalpotential.com/dos-and-donts-of-bulletproof-coffee/ (Year: 2015).*

Coffeesphere, How to Make Orange Creamsicle Cold Brew Coffee, Aug. 13, 2020, pp. 1-16 https://www.coffeesphere.com/orange-creamsicle-cold-brew-coffee/ (Year: 2020).*

Milk Frother, Mircoco Electric Steamer Soft Foam Maker for Hot or Cold Milk Froth; Taotronics, retrieved online Oct. 1, 2024, pp. 1-7. (Year: 2024).*

PCT/US2023/036230, "International Search Report and Written Opinion", dated Feb. 14, 2024, 14 pages.

\* cited by examiner

INFUSING EDIBLE OIL INTO A BEVERAGE

CROSS-REFERENCE TO RELATED APPLICATION

This application claims priority to U.S. Provisional Patent Application No. 63/382,625, filed on Nov. 7, 2022 and titled "Infusing Edible Oil Into A Beverage," the entirety of which is hereby incorporated by reference herein.

TECHNICAL FIELD

The present disclosure relates generally to making beverages. More specifically, but not by way of limitation, this disclosure relates to techniques for incorporating edible oils into beverages.

BACKGROUND

Edible oils are fatty liquids that are physically extracted from vegetables, nuts, or animal tissues. Examples of edible oils can include olive oil, canola oil, flaxseed oil, coconut oil, walnut oil, peanut oil, grapeseed oil, sunflower oil, avocado oil, sesame oil, or fish oil. Many edible oils have known health benefits. For example, olive oil is rich in healthy monounsaturated fats, contains large amounts of antioxidants, and has anti-inflammatory properties. As another example, fish oil is rich in omega-3 fatty acids that may help prevent heart disease and stroke. To obtain the health benefits of these edible oils, individuals may take oil supplements or drizzle the oils onto their food.

SUMMARY

One example of the present disclosure can include a method involving adding edible oil to a container of a beverage appliance, and actuating the beverage appliance. The beverage appliance can be configured to incorporate the edible oil in the container into a beverage or a topping associated with a beverage product.

Another example of the present disclosure can include a method involving adding a liquid base and an edible oil into a container of a beverage appliance; actuating the beverage appliance to produce a foam from the liquid base and the edible oil; and topping a beverage with the foam to produce a beverage product.

Still another example of the present disclosure can include a method involving adding a liquid base and an edible oil into a container of a pressurized cannister; actuating the pressurized cannister to produce a whipped topping from the edible oil and the liquid base; and topping a beverage with the whipped topping to produce a beverage product.

DETAILED DESCRIPTION

Figure 1:
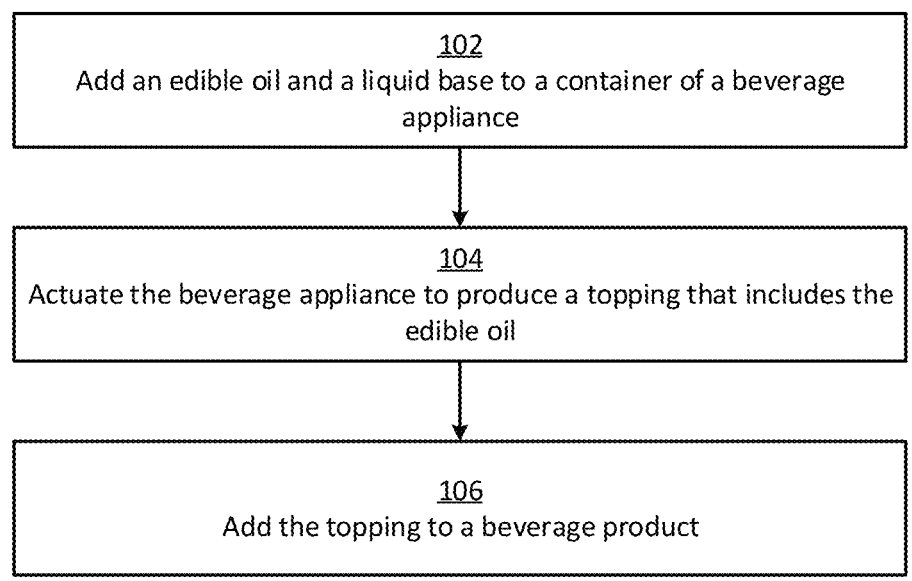
FIG. 1 shows a flowchart of an example of a process for incorporating an edible oil into a topping according to some aspects of the present disclosure.

Many edible oils have known health benefits. But despite these health benefits, edible oils have not conventionally been incorporated into beverages for a wide variety of reasons. One reason is that water and oils generally do not mix well (they are immiscible). Water and oils generally do not mix well because water has polar molecules and oil has non-polar molecules. Other properties of edible oils, such as their density and texture, have also made them undesirable to include in beverages. For example, edible oils have a lower density than water. Because of this property, edible oils poured directly into a beverage will simply float to the top of the beverage, creating an oily layer on top of the beverage. This can be visually unappealing and negatively impact the smell, texture, mouthfeel, and drinking experience of the beverage.

Some examples of the present disclosure can overcome one or more of the abovementioned problems by providing new techniques for incorporating edible oils into a beverage product, which may allow a drinker of the beverage product to obtain the health benefits associated with the edible oil. The beverage product may include any suitable type of beverage, such as coffee, juice, hot chocolate, or a smoothie. The beverage product may also include one or more toppings. Using techniques described herein, an edible oil can be infused (incorporated) into the beverage itself or a topping for the beverage product. For example, the edible oil can be incorporated into a foam or whipped topping for the beverage product. Once incorporated into the beverage product, the edible oil may provide health benefits to the drinker. The edible oil may also enhance the texture, flavor, mouthfeel, and/or visual interest of the topping or beverage, thereby improving the overall drinking experience associated with the beverage product.

One technique described herein for incorporating an edible oil into a beverage product can involve generating an oil-based foam topping for the beverage product. The foam topping can be produced from a combination of an edible oil and a liquid base. The liquid base may be a dairy or non-dairy liquid. For example, the liquid base may include milk, cream, almond milk, soy milk, oat milk, coconut milk, or other milk alternatives. If the liquid base is maintained at a temperature of less than or equal to 100° F. during the foaming process, the resulting foam may be referred to as a "cold" foam. If the liquid base is heated to a temperature of more than 100° F. during the foaming process, the resulting foam may be referred to as a "warm" or "hot" foam. Warm or hot foams may be created using processes that are different from those to create cold foams. For example, warm or hot foams may be created by steaming the oil/liquid-base combination. In contrast, cold foams can be created by blending and aerating the combination using a spinning disk or other mechanical blending mechanism. Either way, a foam topping can be created that is infused with the edible oil and applied as a finisher to the beverage product. This may allow a drinker of the beverage to obtain the taste and health benefits of the edible oil, without many of the drawbacks described above. For example, the foam can have a velvety, creamy texture that is visually appealing and infused with the edible oil for enhanced taste and improved health benefits.

Using an edible oils as a base for a foam may contradict conventional wisdom, given that oil is fatty and fat can have a destabilizing effect on foam. The hydrophobic parts of milk proteins are generally as likely to attach to fat as they are to air, so the more fat in the foam's base, the less air it can hold. But unexpectedly, using steaming and cold-foaming processes can produce a rich foam with sufficient structure for a drink topper. And in some examples, a low-fat or non-fat liquid base can be used to offset the fat in the edible oil, so that the net fat content in the combination is sufficiently low (e.g., less than or equal to that of whole milk) to provide a relatively stable foam for a drink topping. For instance, skim milk may be used as the liquid base. Skim milk may have little (e.g., 0.1% fat) or no fat. Due to this lack of fat, skim milk by itself may produce stable, yet rigid and unflavorful foam. To improve the characteristics of the foam, and edible oil can be added to the skim milk. Since the low-fat content in the skim milk can offset the extra fat from the edible oil, the amount and type of edible oil can be selected to tailor the total fat content in the combination as desired, for example to produce a foam that is relatively stable, creamy, viscous, and flavorful. Using edible oils in this way can allow for more types of liquid bases to be used to create foams that are pleasing to drinkers.

Another technique described herein for incorporating an edible oil into a beverage product can involve generating an oil-based whipped topping for the beverage product. For example, an edible oil can be added to a liquid base in a pressurized canister to produce whipped cream. The liquid base can include any of the types of liquid bases described above. When the pressurized canister is actuated to produce the whipped cream, the gasses (e.g., carbon dioxide, nitrogen, or nitrous oxide) in the cartridge can aerate the combination of the liquid base and the edible oil, and force it through the nozzle of the cannister, to create the whipped topping. The whipped topping can be infused with the edible oil and applied as a finisher to the beverage product. This may allow a drinker of the beverage to obtain the taste and health benefits of the edible oil. For example, the whipped topping can have a velvety, creamy texture that is visually appealing and infused with the edible oil for enhanced taste and improved health benefits.

Like the foam example described above, edible oils can be added to a low-fat or non-fat liquid base to increase the total fat content of the whipping base for a whipped topping. For example, whipped cream is normally made from heavy cream that is high in saturated fats, which may have negative health implications. Rather than using heavy cream, a low-fat or non-fat alternative to heavy cream may be used as the liquid base, which may then be enhanced with an edible oil. For example, a liquid base of whole milk may be used. The whole milk can be supplemented with olive oil, which contains monounsaturated fats that are healthier than the saturated fats in heavy cream. Adding olive oil to the whole milk can increase the total fat content in the whipping base. The amount and type of edible oil can be selected to tailor the total fat content in the combination as desired, for example to produce a whipped topping that is relatively stable, creamy, and flavorful. The resulting whipped cream may be both flavorful and healthier than traditional whipped cream, because the saturated fats of the heavy cream have been replaced by the monounsaturated fats of the olive oil. Using edible oils in this way can allow for more types of liquid bases to be used to create whipped toppings that are healthier and more pleasing to drinkers.

Other techniques are also described herein for incorporating one or more edible oils into a beverage product. Some of those techniques include shaking or stirring the edible oil in the beverage itself. Combinations of techniques may also be used to incorporate one or more edible oils into a beverage product. For example, an edible oil may be both shaken and stirred into a beverage. This may help disperse the edible oil more evenly (e.g., relatively evenly) throughout the beverage. As another example, a first edible oil can be mixed directly into the beverage itself and a second edible oil can be incorporated into a topping for the beverage, thereby producing a beverage product that includes two different edible oils. This may allow the drinker to obtain the health benefits associated with both edible oils. The types and amounts of the edible oils can be selectively tailored to produce an overall beverage product that has a desired taste, texture, and/or visual profile.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a flowchart of an example of a process for incorporating an edible oil into a topping according to some aspects of the present disclosure. The process begins at block 102. At block 102, an edible oil and a liquid base are added to a container of a beverage appliance. Examples of the edible oil can include olive oil, canola oil, flaxseed oil, coconut oil, walnut oil, peanut oil, grapeseed oil, sunflower oil, avocado oil, sesame oil, and/or fish oil. Examples of the liquid base may include milk, cream, almond milk, soy milk, oat milk, coconut milk, and/or other milk alternatives. The edible oil can be a solid (e.g., a powder) or a liquid. The edible oil can be poured or sprinkled into the container. For example, if the edible oil is in liquid form, the edible oil and the liquid base can both be poured into the container. If the edible oil is a solid, the edible oil can be sprinkled into the liquid base in the container.

In some examples, the edible oil may be added to the container from a first receptacle and the liquid base may be add to the container from a second receptacle, where the second receptacle is separate from the first receptacle. Alternatively, the edible oil and the liquid base may be premixed and poured into the container together as a combined fluid. For instance, the edible oil and the liquid base can both be liquids that are prepackaged together as a mixture, which can be poured into the container as a combination.

The type and amount of edible oil can be selected depending on the target characteristics of the resulting topping. In some examples, 13-17 milliliters (mL) of edible oil can be used to produce a foam or whipped topping with a generally pleasing texture, taste, and mouthfeel. For instance, 15 mL of extra-virgin olive oil can be added to the container to produce a foam or whipped cream with an acceptable texture and taste. The edible oil and liquid base can be mixed in any suitable proportions depending on the target characteristics of the resulting topping. For instance, they can be mixed in a proportion of 0.5 fluid ounces (fl oz) of edible oil to 5.0-10.0 fl oz of liquid base. In some examples, they can be mixed in a proportion of 0.3-0.6 fl oz of edible oil to 4.0-11.0 fl oz of liquid base.

In block 104, the beverage appliance can be actuated to produce a topping that includes the edible oil. The beverage appliance may be any type of mechanical device that is primarily designed for use in making a topping. Examples of the topping can include a warm or hot foam, a cold foam, or a whipped topping.

As one specific example, the beverage appliance may be designed to make warm or hot foam. For instance, the beverage appliance may be an espresso machine with a built-in steamer that includes the container. The edible oil and liquid base can be added to the container of the steamer for use in a steaming process. In this example, the edible oil and the liquid base may be added to the container in a ratio of 0.5 fl oz of edible oil to 7.0-9.0 fl oz of the liquid base. During the steaming process, the steamer can expel heated jets of air through holes in a wand. The jets of air can break the surface of the liquid base/oil combination and fold air into the combination, to thereby produce a warm or hot foam that includes the edible oil.

As another example, the beverage appliance can be a cold-foam machine designed to produce cold foam. The cold-foam machine can include the container. The cold-foam machine can also include a disk, whisk, or other mechanical component. The mechanical component can be rotated by a motor, which may be electrically activated and controlled by the cold-foam machine. Rotation of the mechanical component can blend and aerate the contents in the container, to thereby produce a cold foam that includes the edible oil.

As another example, the beverage appliance can be a pressurized canister, such as an iSi Canister®. The pressurized canister can include the container and an attached cartridge, which can be pressurized with a gaseous whipping agent. When actuated, the pressurized canister can transmit the whipping agent (e.g., carbon dioxide or nitrogen dioxide) from the attached cartridge through the contents of the container. This can aerate the contents of the container, to thereby create a whipped topping that includes the edible oil.

In block 106, the topping can be added to a beverage product. For example, the foam or whipped topping can be used to top or otherwise finish the beverage product prior to its delivery to a customer. This may involve pouring or otherwise placing the foam or whipped topping on top of a beverage of the beverage product.

Figure 2:
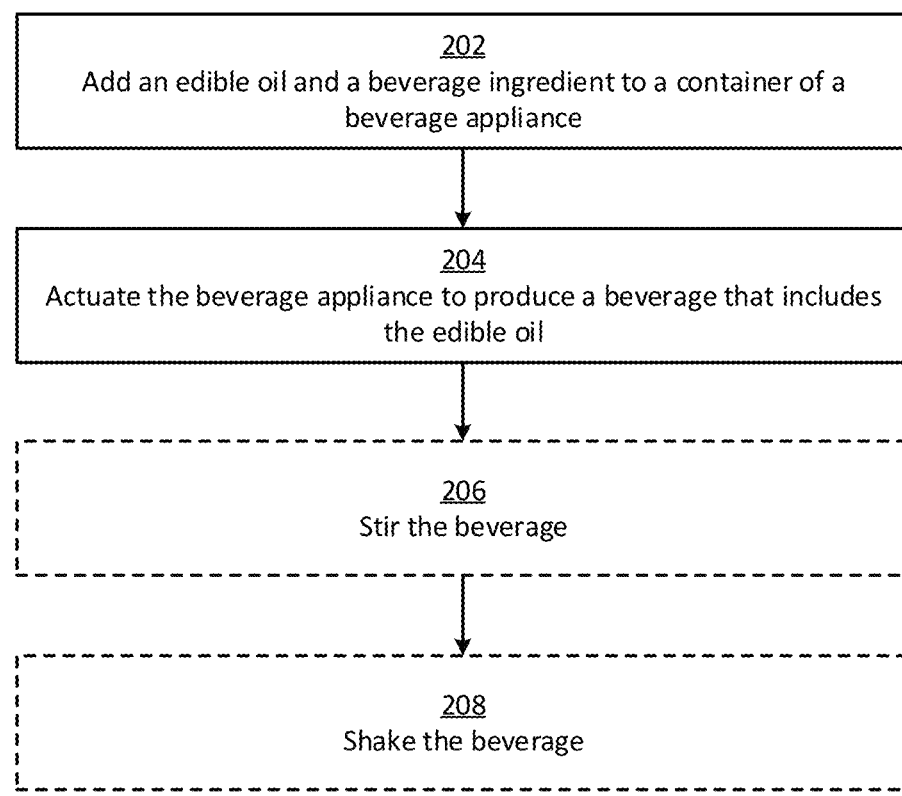
FIG. 2 shows a flowchart of an example of a process for incorporating an edible oil into a beverage according to some aspects of the present disclosure.

FIG. 2 is a flowchart of an example of a process for incorporating an edible oil into a beverage according to some aspects of the present disclosure. The process begins at block 202. At block 202, an edible oil and a beverage ingredient are added to a container of a beverage appliance. The edible oil can be a solid (e.g., a powder) or a liquid. The edible oil can be poured or sprinkled into the container. The beverage ingredient can also be a solid or a liquid. Examples of the beverage ingredient can include coffee grounds, coffee beans, tea leaves, coco powder, water, syrup, etc. The beverage ingredient can be poured or sprinkled into the container.

In some examples, the edible oil may be added to the container from a first receptacle and the beverage ingredient may be add to the container from a second receptacle, where the second receptacle is separate from the first receptacle. Alternatively, the edible oil and the beverage ingredient may be premixed and added to the container together as a combination. For instance, the edible oil and the beverage ingredient can both be solids that are prepackaged together as a mixture, which can be poured into the container as a combination.

The type and amount of edible oil can be selected depending on the target characteristics of the resulting beverage. In some examples, 13-17 mL of edible oil can be used to produce a beverage with a generally pleasing texture, taste, and mouthfeel. For instance, 15 mL of extra-virgin olive oil can be added to the container to produce a beverage with an acceptable texture and taste. The edible oil and beverage ingredient can be mixed in any suitable proportions depending on the target characteristics of the resulting beverage product. For instance, they can be mixed in a proportion of 0.3-0.6 fl oz of edible oil to 2.0-15.0 fl oz of beverage ingredient.

In some examples, the container can be configured to house coffee grounds for use in brewing coffee. For instance, the container may be a funnel assembly or filter basket of a coffee machine, where the funnel assembly or filter basket can hold the coffee grounds during the brewing process. The coffee grounds can be poured into the container and then the edible oil may be poured onto the coffee grounds. Alternatively, the edible oil can be poured into the container and then the coffee grounds can be poured onto the edible oil. Either way, after the coffee grounds and edible oil are added to the container, the coffee machine can be actuated to brew coffee from the mixture.

In other examples, the container can be configured to house coffee beans for use in brewing coffee. For instance, the container may be part of a bean grinder (e.g., an electromechanical griding machine) for grinding coffee beans into coffee grounds. The bean grinder may or may not be part of a coffee machine. The coffee beans can be poured into the container and then the edible oil may be poured onto the coffee beans. Alternatively, the edible oil can be poured into the container and then the coffee beans can be poured into the edible oil. Either way, after the coffee beans and edible oil are added to the container, the bean grinder can be actuated to grind the combination into a mixture of coffee grounds and edible oil. Coffee can then be brewed from the mixture.

In some examples, the container can be configured to house tea leaves for use in brewing tea. For instance, the container may be a funnel assembly or filter basket of a tea machine, where the funnel assembly or filter basket can hold the tea leaves during the brewing process. The tea leaves can be poured into the container and then the edible oil may be poured onto the tea leaves. Alternatively, the edible oil can be poured into the container and then the tea leaves can be poured into the edible oil. Either way, after the tea leaves and edible oil are added to the container, the tea machine can be actuated to brew tea from the mixture.

In other examples, the container can be configured to house coco powder or other ingredients for use in brewing hot chocolate. For instance, the container may be a funnel assembly or filter basket of a hot chocolate machine, where the funnel assembly or filter basket can hold the coco powder during the brewing process. The coco powder can be poured into the container and then the edible oil may be poured onto the coco powder. Alternatively, the edible oil can be poured into the container and then the coco powder can be poured onto the edible oil. Either way, after the coco powder and edible oil are added to the container, the hot chocolate machine can be actuated to brew hot chocolate from the mixture.

In some examples, the container can be configured to store water for use in brewing coffee, tea, or hot chocolate. For instance, the container may be a water reservoir (e.g., of a coffee maker) from which water is drawn and heated (e.g., to above 140° F.) during the brewing process. In some such examples, the edible oil may be poured directly into the water reservoir prior to initiating the brewing process.

In block 204, the beverage appliance is actuated to produce a beverage that includes the edible oil. Examples of the beverage appliance can include a coffee machine, a bean grinder, or a tea machine. If the beverage appliance is a coffee machine, the coffee machine can be actuated to perform a brewing process through which heated water is transferred through the combination of coffee grounds and the edible oil to produce a coffee that includes the edible oil. In some examples, the water may be heated to 140° F. or higher. The coffee can be captured in a pot, cup, or other receptacle that is separate from the container. Transferring the heated water through the combination can help incorporate the edible oil into the coffee liquid. Emulsifiers may be added at any suitable time (e.g., to the container in block 202 or to the coffee after block 204) to help maintain the integrity of the mixture. Examples of such emulsifiers can include egg yolk, butter, and honey. The heated water can be passed through the coffee grounds, oil, and emulsifier at a sufficiently slow speed to produce an emulsion from those ingredients.

As another example, if the beverage appliance is a tea machine, the tea machine can be actuated to perform a brewing process through which heated water is transferred through the combination of tea leaves and the edible oil to produce a tea that includes the edible oil. The water may be heated to 140° F. or higher. The tea can be captured in a pot, cup, or other receptacle that is separate from the container. Transferring the heated water through the combination can help incorporate the edible oil into the tea liquid. Emulsifiers may be added at any suitable time (e.g., to the container in block 202 or to the tea after block 204) to help maintain the integrity of the mixture. The heated water can be passed through the tea leaves, oil, and emulsifier at a sufficiently slow speed to produce an emulsion from those ingredients.

As yet another example, if the beverage appliance is a hot chocolate machine, the hot chocolate machine can be actuated to perform a brewing process through which heated water is transferred through the combination of coco powder and the edible oil to produce a hot chocolate that includes the edible oil. The hot chocolate can be captured in a pot, cup, or other receptacle that is separate from the container. Transferring the heated water through the combination can help incorporate the edible oil into the hot chocolate. Emulsifiers may be added at any suitable time (e.g., to the container in block 202 or to the hot chocolate after block 204) to help maintain the integrity of the mixture. The heated water can be passed through the coco powder, oil, and emulsifier at a sufficiently slow speed to produce an emulsion from those ingredients.

In some examples, the beverage resulting from blocks 202-204 may optionally be mechanically mixed to help further disperse the edible oil in the beverage. For example, the beverage may be stirred and/or shaken, as shown in blocks 206-208, to more evenly disperse the edible oil in the beverage. The beverage appliance or other machines may be used to perform the stirring and shaking. For example, an electromechanical stirring device such as a blender may be used to stir the oil/beverage combination. As another example, an electromechanical shaking device may be used to shake the oil/beverage combination.

Figure 3:
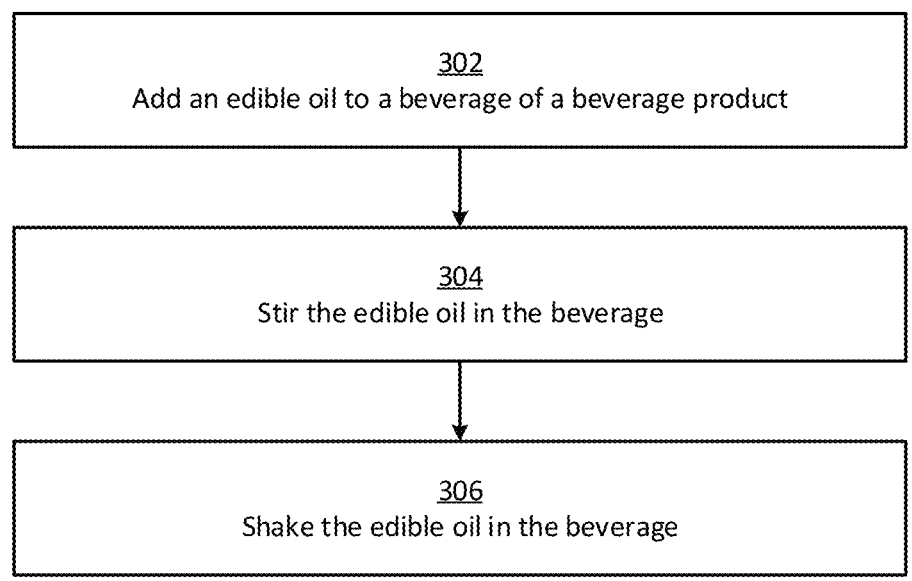
FIG. 3 shows a flowchart of an example of a process for mechanically mixing an edible oil into a beverage according to some aspects of the present disclosure.

FIG. 3 is a flowchart of an example of a process for mechanically mixing an edible oil into a beverage according to some aspects of the present disclosure. The process begins at block 302. At block 302, an edible oil is added to a beverage of a beverage product. The edible oil can be a solid (e.g., a powder) or a liquid. If the edible oil is in liquid form, the edible oil can be poured into the beverage. If the edible oil is a solid, the edible oil may be sprinkled into the beverage. The edible oil may be added to the beverage from a first receptacle, which may be separate from a second receptacle containing the beverage.

The type and amount of edible oil can be selected depending on the target characteristics of the resulting beverage. In some examples, 13-17 mL of edible oil can be used to produce a beverage with a generally pleasing texture, taste, and mouthfeel. For instance, 15 mL of extra-virgin olive oil can be added to the beverage to produce an acceptable texture and taste. The edible oil and beverage can be mixed in any suitable proportions depending on the target characteristics of the resulting beverage product. For instance, they can be mixed in a proportion of 0.3-0.6 fl oz of edible oil to 4.0-15.0 fl oz of beverage.

In blocks 304, the edible oil can be stirred in the beverage. This may more evenly disperse the edible oil in the beverage. A beverage appliance may be used to perform the stirring. For example, an electromechanical stirring device may be used to stir the oil/beverage combination. An example of the stirring device may be a blender.

In blocks 306, the edible oil can be shaken in the beverage. This may more evenly disperse the edible oil in the beverage. A beverage appliance may be used to perform the shaking. For example, an electromechanical shaking device may be used to shake the oil/beverage combination.

Although FIGS. 1-3 each show a certain number and order of steps, it will be appreciated that these figures are intended to be illustrative and non-limiting. Other examples may involve more steps, fewer steps, different steps, or a different order of steps than is shown in each of FIGS. 1-3. For instance, the order of the stirring and shaking can be reversed, or one of those steps may be omitted, in each of FIGS. 2-3.

Figure 4:
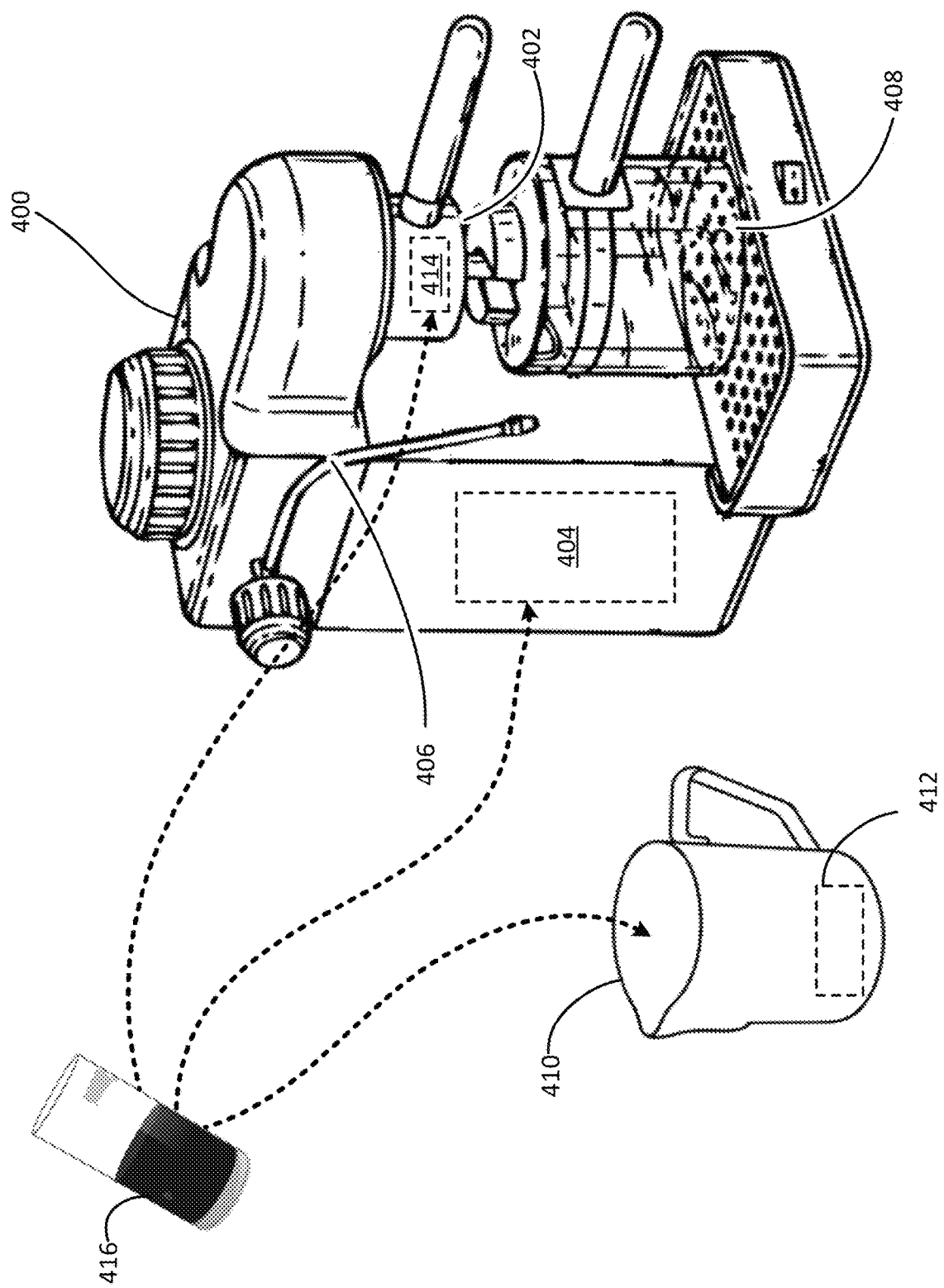
FIG. 4 shows an example of a beverage appliance usable for incorporating an edible oil into a beverage according to some aspects of the present disclosure.

FIG. 4 shows an example of a beverage appliance 400 usable for incorporating an edible oil 416 into a beverage according to some aspects of the present disclosure. In this example, the beverage appliance 400 is a coffee machine, though other types of beverage appliances may be used in other examples. The beverage appliance 400 can include one or more containers, such as container 402 or 404. Container 402 may store coffee grinds 414 for brewing coffee. Container 404 may store water for brewing coffee. The coffee can be dispensed by the coffee machine into a receptacle 408 that is separate from the containers 402, 404.

In this example, the coffee machine also includes a steamer 406. The steamer 406 can be used to make foam (e.g., warm or hot foam) for a beverage product. The foam may be created by applying the steamer 406 to a liquid base 412 in a container 410. The steamer 406 can include multiple nozzles that can inject air into the liquid base 412 to create the foam.

In some examples, an edible oil 416 can be added to one or more of the containers 402, 404, 410. The beverage appliance 400 can then be actuated to create a beverage or a topping that includes the edible oil. For example, the edible oil 416 can be added to the coffee grinds 414 in container 402. The coffee machine can then be actuated to brew coffee using the oil/grinds mixture. As another example, the edible oil 416 can be added to the water in container 404. The coffee machine can then be actuated to brew coffee using the oil/water mixture. As still another example, the edible oil 416 can be added to a liquid base 412 in container 410. The steamer 406 can then be actuated to produce a foam from the oil/liquid-base mixture. The foam can be poured on top of the coffee to produce the final beverage product.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A method comprising:
pouring edible oil from a receptacle into a first container of a beverage appliance positioned at a location, wherein the receptacle is different from the first container, the first container including a combination of a liquid base and the edible oil, wherein the combination has a proportion of 0.3-0.6 fluid ounces (fl oz) of the edible oil to 4.0-11.0 fl oz of the liquid base;
actuating the beverage appliance at the location, wherein the beverage appliance creates a cold foam separately from a beverage by rotating a mechanical component in the combination in the first container, the beverage being stored in a second container that is different from the first container, the first container excluding the beverage;
after creating the cold foam, pouring the cold foam from the first container onto the beverage such that a majority of the cold foam sits on top of the beverage, to thereby produce a beverage product; and
providing the beverage product with the edible oil to a customer at the location.

2. The method of claim 1, wherein the edible oil includes olive oil, canola oil, flaxseed oil, coconut oil, walnut oil, peanut oil, grapeseed oil, sunflower oil, avocado oil, or sesame oil.

3. The method of claim 1, wherein the beverage includes coffee or tea.

4. The method of claim 1, wherein the liquid base includes a dairy liquid.

5. The method of claim 1, wherein the liquid base includes a non-dairy liquid.

6. The method of claim 1, wherein the beverage appliance is an electromechanical device that generates the cold foam by rotating the mechanical component to blend and aerate the combination.

7. The method of claim 1, wherein the edible oil is a dry powder.

8. The method of claim 1, wherein a majority of the combination is the liquid base and a minority of the combination of the edible oil.

9. The method of claim 1, wherein the combination includes 13-17 milliliters (mL) of the edible oil.

10. A method comprising:
storing a beverage of a beverage product in a first container;
adding a liquid base and an edible oil into a second container of a beverage appliance, the second container being separate from the first container, such that the second container includes a combination of the liquid base and the edible oil, wherein the combination has a proportion of 0.3-0.6 fluid ounces (fl oz) of the edible oil to 4.0-11.0 fl oz of the liquid base, and wherein the second container excludes the beverage;
actuating the beverage appliance to produce a cold foam from the combination, the cold foam being different from a whipped topping generated using a pressurized cannister;
after producing the cold foam, pouring the cold foam onto the beverage such that a majority of the cold foam sits on top of the beverage to produce the beverage product; and
providing the beverage product to a customer.

11. The method of claim 10, wherein the beverage appliance rotates a mechanical component to generate the cold foam by blending and aerating the combination.

12. The method of claim 10, wherein adding the liquid base and the edible oil into the second container comprises:
pouring the liquid base from a first receptacle into the second container; and
pouring the edible oil from a second receptacle into the second container, the second receptacle being separate from the first receptacle.

13. The method of claim 10, wherein the edible oil includes olive oil, canola oil, flaxseed oil, coconut oil, walnut oil, peanut oil, grapeseed oil, sunflower oil, avocado oil, or sesame oil.

14. The method of claim 10, wherein the beverage includes coffee.

15. The method of claim 10, wherein the beverage includes tea.

16. The method of claim 10, wherein the liquid base includes a dairy liquid.

17. The method of claim 10, wherein the liquid base includes a non-dairy liquid.

18. The method of claim 10, wherein the edible oil is a dry powder.

19. The method of claim 10, wherein the combination includes 13-17 milliliters (mL) of the edible oil.

20. The method of claim 10, wherein a majority of the combination is the liquid base and a minority of the combination of the edible oil.

* * * * *